(12) United States Patent
Boustead et al.

(10) Patent No.: US 8,116,325 B2
(45) Date of Patent: Feb. 14, 2012

(54) ACTIVE NETWORKS

(75) Inventors: Paul Andrew Boustead, Wollongong (AU); Farzad Safaei, Mount Keira (AU); Bruce Raymond Ratcliff, Emerald (AU)

(73) Assignee: Telstra Corporation Limited, Melbourn, Victoria, Ontario ( * ) Notice: Subject to any disclaimer, the term of this patent is extended or adjusted under 35 U.S.C. 154(b) by 1271 days.

(21) Appl. No.: 10/495,819

(22) PCT Filed: Nov. 15, 2002

(86) PCT No.: PCT/AU02/01559
§ 371 (c)(1),
(2), (4) Date: Apr. 18, 2005

(87) PCT Pub. No.: WO03/045016
PCT Pub. Date: May 30, 2003

(65) Prior Publication Data
US 2005/0220072 A1 Oct. 6, 2005

(30) Foreign Application Priority Data
Nov. 16, 2001 (AU) .................................... PR8932

(51) Int. Cl.
*H04L 12/28* (2006.01)
*H04L 12/56* (2006.01)
(52) U.S. Cl. ........................................ 370/401; 370/396
(58) Field of Classification Search ................. None
See application file for complete search history.

(56) References Cited

U.S. PATENT DOCUMENTS

| | | | |
|---|---|---|---|
| 6,262,983 B1 * | 7/2001 | Yoshizawa et al. | 370/389 |
| 6,496,940 B1 * | 12/2002 | Horst et al. | 714/4 |
| 7,061,921 B1 * | 6/2006 | Sheth | 370/395.52 |
| 7,174,427 B2 * | 2/2007 | Ramia | 711/132 |
| 7,376,125 B1 * | 5/2008 | Hussain et al. | 370/352 |
| 2001/0049739 A1 | 12/2001 | Wakayama et al. | |
| 2002/0146009 A1 * | 10/2002 | Gupta et al. | 370/392 |

(Continued)

FOREIGN PATENT DOCUMENTS
EP 1246415 A2 10/2002

OTHER PUBLICATIONS

Maxemchuk, N. F., and S. H. Low. "Active Routing." IEEE Journal on Selected Communications 19.No. 3 (Mar. 2001): 552-65. IEEE xplore. Web. Nov. 20, 2009.*

(Continued)

*Primary Examiner* — Ayaz Sheikh
*Assistant Examiner* — Sori Aga
(74) *Attorney, Agent, or Firm* — Nixon Peabody LLP

(57) ABSTRACT

An active node of a communications network includes a forwarding component for forwarding a packet of an active application, a processor for processing the packet, and a forwarding control component for modifying path data associated with the packet, based on the processing. The forwarding component can forward said packet directly to the network or via the processor. The processing can include executing code contained within the packet, and/or executing code to process application data in the packet. The path data can include the MPLS label stack of the packet and/or MPLS tables of the forwarding component. To allow processing based on multiple labels of a packet, the forwarding component can include a loopback connection between its input and output ports.

37 Claims, 10 Drawing Sheets

U.S. PATENT DOCUMENTS

2002/0156918 A1* 10/2002 Valdevit et al. ............... 709/238
2004/0202171 A1* 10/2004 Hama ...................... 370/395.1

OTHER PUBLICATIONS

Andersson et al, LDP Specification—draft-ietf-mpls-idp-09.txt, Aug. 2000, http://tools.ietf.org/wg/mpls/draft-ietf-mpls-ldp/draft-ietf-mpls-09.txt (printed Oct. 24, 2006).
*Ensim :: Software Solution for Hosted Services Delivery*, http://www.ensim.com, date unknown (printed Dec. 1, 2005).
*Vmware, Inc.*, http://www.vmware.com, date unknown (printed Dec. 1, 2005).
Chen, Thomas M., *Evolution to the Programmable Internet*, Active, Programmable, and Mobile Code Networking, IEEE Communications Magazine, (Mar. 2000) pp. 124-128, Issue No. 0163-6804/00, Southern Methodist University.
Lavian, Tal, et al., *Active Networking on a Programmable Networking Platform*, Technology Centre, Nortel Networks Corporation, (unknown) pp. 1-9.
Wolf, Tilman, et al., *Tags for High Performance Active Networks*, Applied Research Laboratory, Department of Computer Systems, (unknown) pp. 1-8, Uppsala University, Sweden.

* cited by examiner

ACTIVE NETWORKS

FIELD OF THE INVENTION

The present invention relates to active communications networks, and in particular to an active node and a process for processing packets in an active network.

BACKGROUND

Active or programmable networks are packet-switched networks in which packets sent from a source node to a destination node can contain code that is executed by one or more intermediate nodes. Active networks have been developed not so much to provide a distributed processing environment as to provide a customisable network to meet the needs of its users. For example, active networks can provide quality of service (QoS) and other network management functions, virtual networking, and enhanced data services to their users. In contrast, non-active networks are not generally controllable by their users.

The use of active network nodes in a telecommunications carrier grade network allows executable code to be injected into the network to enable the provision of new services. Practical deployment of active network components generally requires the data path to be disturbed to a minimum. Packets in an active network can be considered to include active packets that require processing within the network, and non-active packets that are simply forwarded to their destination on a fast pathway. Active packets can contain code for execution in the network, references to executable code, and/or data to be processed by an active application within the network. Scalability is an issue for active networks, and active applications with a majority of active packets are not generally scalable. However, applications with a relatively small fraction of active packets and a majority of non-active packets are more likely to scale. There is a need for an active node that allows scalable extraction of a subset of active packets from a stream of active and non-active packets at line rate to allow the implementation of new services and a process for processing packets of an active application that alleviate one or more difficulties of the prior art, or at least provide a useful alternative to existing active nodes and packet processes.

SUMMARY OF THE INVENTION

In accordance with the present invention there is provided an active node for a communications network, including:
  a forwarding component for forwarding a packet of an active application;
  a processor for processing said packet; and
  a forwarding control component for modifying path data associated with said packet based on said processing.

The present invention also provides a process for processing packets of an active application in a communications network, including:
  processing code of an active packet of said application to determine a path for said packets;
  storing path data representing said path in said packets; and
  forwarding said packets on said path.

The present invention also provides a process for processing an active packet in a communications network, including:
  receiving an active packet including path data;
  processing said active packet;
  modifying said path data in accordance with said processing; and
  forwarding said packet in accordance with the modified path data.

The present invention also provides a process for processing packets of an active application in a communications network, including:
  selecting, for one or more packets of said application, one or more paths to respective processors based on requirements of said one or more packets and capabilities of said processors;
  storing path data representing said selected one or more paths in said one or more packets; and
  forwarding each of said one or more packets in accordance with said path data of the packet.

The present invention also provides a process for processing packets of an active application in a communications network, including:
  determining requirements of said application from the first at least one packet of said application;
  selecting one or more paths to respective processors based on said requirements and capabilities of said processors;
  storing path data representing the selected one or more paths in each packet; and
  forwarding said packets in accordance with said path data.

The present invention also provides a process for processing an active packet in a communications network, including:
  receiving an active packet including first path data and second path data;
  removing said first path data from said packet; and
  forwarding said packet in accordance with said second path data of said packet.

The present invention also provides an active node for a communications network having:
  a processor for processing active packets; and
  a forwarding component for determining, on the basis of at least one label of packets received from the network, to forward said packets to said processor or output said packets to said network.

The present invention also provides an active node for executing the steps of any one of the above methods.

The present invention also provides software modules having code for executing the steps of any one of the above methods.

BRIEF DESCRIPTION OF THE DRAWINGS

Preferred embodiments of the present invention are hereinafter described, by way of example only, with reference to the accompanying drawings, wherein.

DETAILED DESCRIPTION OF THE PREFERRED EMBODIMENTS

Figure 1:
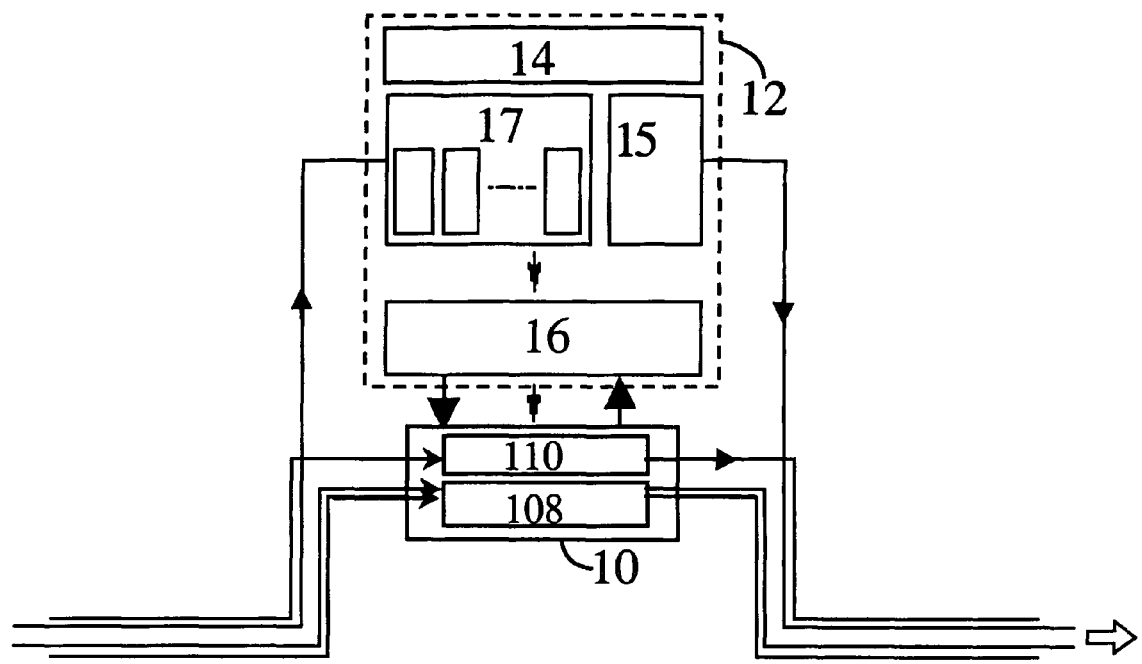
FIG. 1 is a schematic diagram of a preferred embodiment of an active node of a communications network.

An active node of a communications network executes a packet process that processes an active application packet and forwards the packet and subsequent packets of the application to other active nodes or non-active nodes of the network on the basis of code contained in the active application packet. As shown in FIG. 1, the active node includes a high-speed forwarding component or fast path component 10 and a processing component 12. The processing component 12 includes an active processing engine 14, control modules 15, application modules 17, and a forwarding control module 16.

The processing component 12 is connected to output and input ports of the fast path component 10 so that the processing component 12 can function as an adjunct processor to the fast path component 10. Specifically, a first output port of the fast path component 10 is connected to an input port of the processing component 12. An output port of the processing component 12 is fed back to an input port of the fast path component 10. Using the forwarding control module 16, the processing component 12 also communicates with the fast path component 10 using a separate connection to a management port of the fast path component 10.

The fast path component 10 receives packets from the network and forwards them to an appropriate destination. Some of these packets are passed to the processing component 12 for processing by the active processing engine 14. The active processing engine 14 includes one or more microprocessors for executing active application code in active packets of an active application. The forwarding control module 16 is used by an active application to change the forwarding destination of non-active packets belonging to the same application and forwarded on the fast path component 10. The fast path component 10 is described as rigid if application-specific integrated circuits (ASICs) are used to forward packets. If network processors including software modules are used to process packets, then the fast path component 10 has a rigid component 108 defined by the functions implemented in hardware, and a semi-flexible component 110 that is defined by the network processor software. The semi-flexible component 110 enhances the flexibility of active fast path forwarding, particularly for quality-of-service (QoS) support.

In the described embodiment, the fast path component 10 is a high-speed packet switch such as a Cisco® or Nortel® multi-protocol label switching (MPLS) switch. The processing component 12 is a standard computer system such as an Intel® x86-based personal computer running a Linux® operating system. The packet process executed by the active node is implemented as software modules, being the control, application, and forwarding control modules 15 to 17 of the active node. However, it will be apparent to the skilled addressee that at least some of the steps of the packet process may be alternatively implemented by dedicated hardware components such as application-specific integrated circuits (ASICs). It will also be apparent that the fast path component 10 and the processing component 12, described herein as separate but linked entities, can alternatively be combined to form a single, integrated active node device.

The active node uses a protocol known as multi-protocol label switching (MPLS) for packet routing, as described in RFC 3031. MPLS allows multiple labels to be included in each packet in the form of a label stack. The label stack is placed in a shim header that is inserted between the layer 2 and layer 3 packet headers. Permissible label stack operations include push, pop and forward. Labels can be pushed onto the top of the stack and labels can be popped off the top of the stack. The label at the top of the stack is used for forwarding the packet on a particular label-switched path (LSP), determined by using the label as an index into an MPLS forwarding table. MPLS label stacks have been used for traffic engineering, and for creating overlay networks such as virtual private networks (VPNs). Label stacks enable multiple levels of tunnelling, and this property makes them useful for active packet forwarding.

The active node uses MPLS tunnels for active packet forwarding by allowing active applications to modify MPLS forwarding tables stored in the fast path component 10 and by allowing MPLS label push and pop operations to be performed on packets within the fast path component 10 and within the processing component 12. Moreover, the processing component 12 can be partitioned into multiple virtual processing components using virtual server software such as Ensim Private Server or VMware providing secure execution environments for users of the network. Accordingly, an LSP can also specify a particular virtual processing component or execution environment within an active node of the network. Finally, an LSP can also identify a particular application to be used to process an active packet. The use of labels improves the efficiency of active networking by specifying one or more fast paths to destinations where active processing is to be performed. The expression 'fast path' refers to a path through one or more fast path components 10 of one or more active nodes without passing through any processing components 12 of those nodes.

Figure 2A:
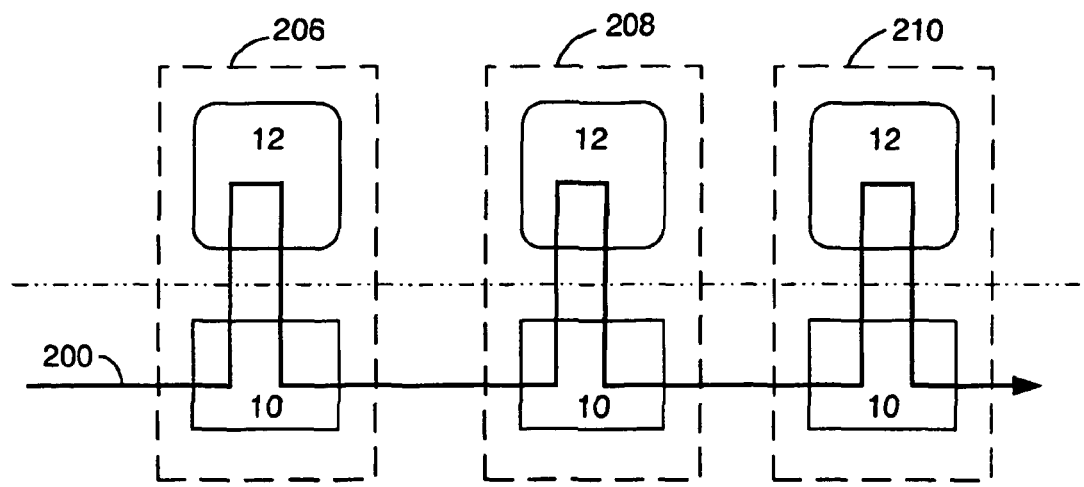
FIGS. 2A to 2C are schematic diagrams illustrating paths taken by packets of an application in a network including active nodes.
Figure 2B:
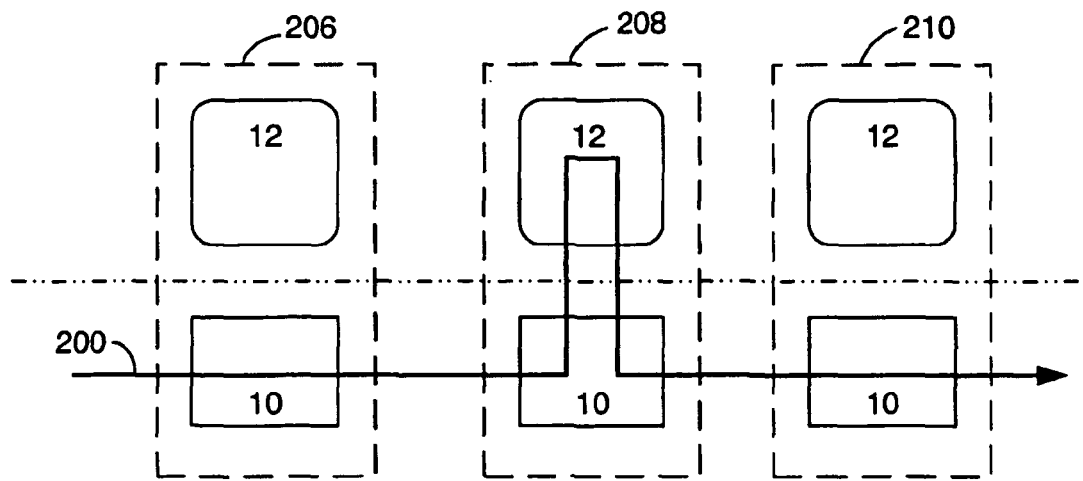
Figure 2C:
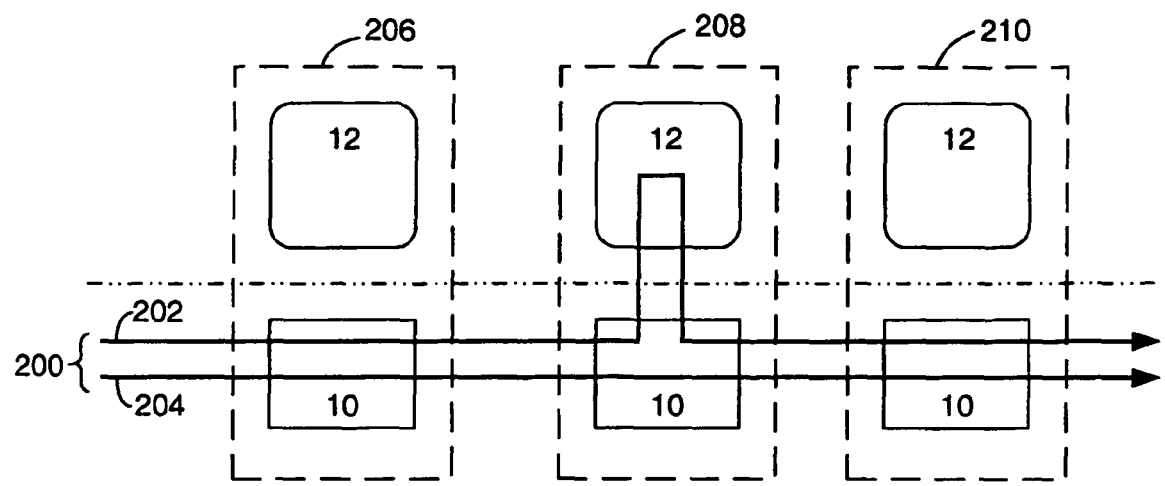

Prior art active networks have used various filtering or tagging methods that allow each active node receiving a packet to determine whether it needs to process the packet or simply forward it on the network. However, as shown in FIG. 2A, this requires every packet 200 to be received and processed by every active node 206 to 210. This is an inefficient use of resources, wasting processing cycles and decreasing throughput. In contrast, the use of a label stack allows packets 200 to be directed to particular active nodes for processing. For example, all the packets 200 of an application can be directed to the processing component 12 of a particular active node 208, as shown in FIG. 2B. Alternatively, the packets 200 can be divided into two flows or label-switched paths 202, 204, whereby only the packets that require processing are directed on a first path 202 to be processed by a particular active node 208, with the remainder sent on a fast path 204 bypassing the processing components 12 of all active nodes 206 to 210, as shown in FIG. 2C. The determination of whether a packet requires processing or not can be performed by a content switch at the edge of the MPLS network, as described below.

Figure 3:
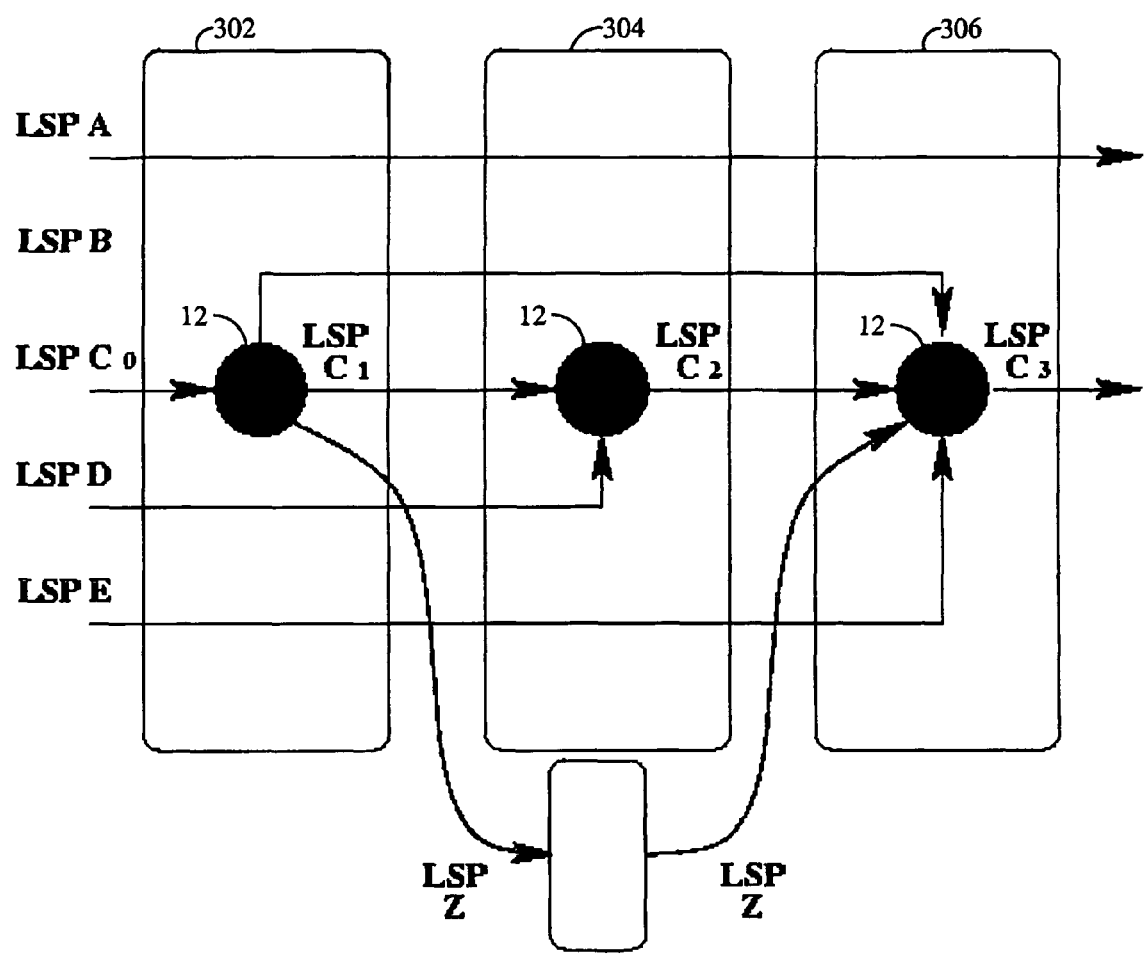
FIG. 3 is a schematic diagram illustrating paths taken by packets of an application through three active nodes.

A communications network includes three active nodes 302 to 306, as shown in FIG. 3. Six label switched paths (LSPs) A to E and Z are defined in MPLS forwarding tables of each node 302 to 306. Packets on LSP A are switched through all active nodes 302 to 306 on a fast path through the fast path component 10 of each active node without passing through any processing components 12 of the nodes 302 to 306. LSPs C0 to C3 connect the active processing engine 14 of each active node with the active processing engine 14 of the next active node in the path. LSP B connects the active processor 14 of the first node 302 to the active processor 14 of the third node 306. LSP Z represents an alternate path from the first node 302 to the third node 306.

The network supports applications that implement a Programmable Virtual Network (PVN). A PVN allows a telecommunications carrier to provide a virtual network topology to its customers, allowing them to implement their own routing, billing, network management protocols and other customized protocols such as multicast. In order to implement a PVN, it is necessary to identify which packets belong to the PVN so that custom routing and forwarding mechanisms can be used. It is also necessary to determine which packets are active and are processed by active applications of the application modules 17 for mechanisms such as custom routing protocols.

A particular PVN application uses active packets to monitor link failures in a PVN. LSP A follows the path of an established PVN link, and LSPs C0 to C3 are used for active packets whose content is processed by each active node 302 to 306. As in standard MPLS networks, labels are inserted into the headers of packets by content switches (not shown, but typically a level 4-7 network switch such as a Nortel Alteon® web switching module) at the edge of the MPLS network, based on the content of each packet. For example, a content switch receives five packets of the PVN link application. Packet 1 is a non-active data packet in the PVN and only requires fast path forwarding. Accordingly, label A is pushed on the top of the packet's label stack and the packet is forwarded to the first node 302. Packets 2 and 3 are active packets that are to be processed by the first node 302 and so have label C0 at the top of their stacks, followed by label A.

Figure 4A:
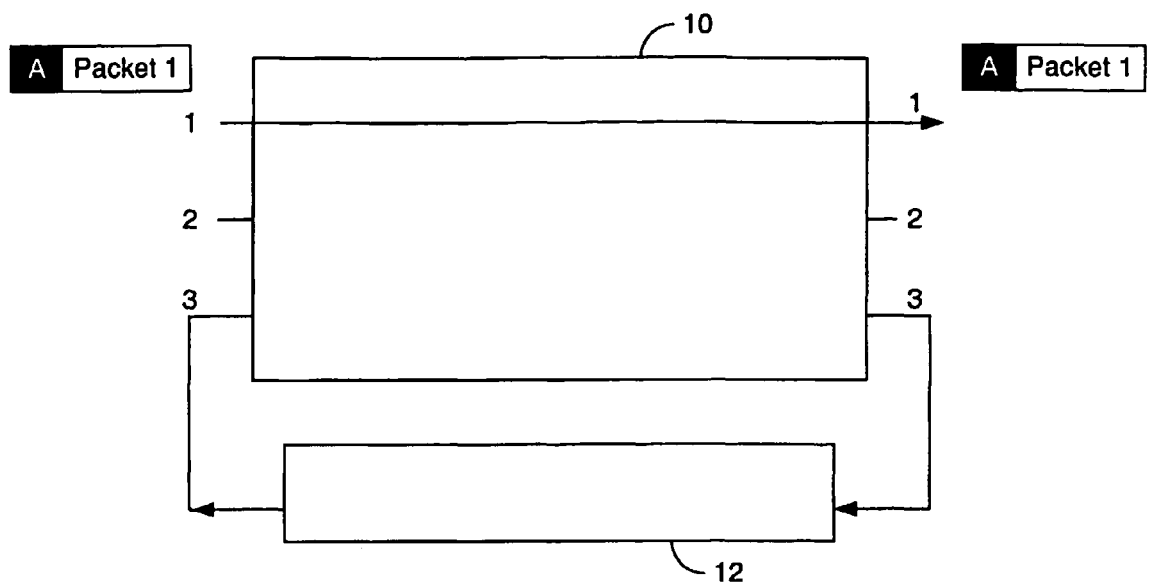
FIGS. 4A to 4E are schematic diagrams illustrating the processing of five packets with different MPLS stack contents in the first active node of FIG. 3.
Figure 7:
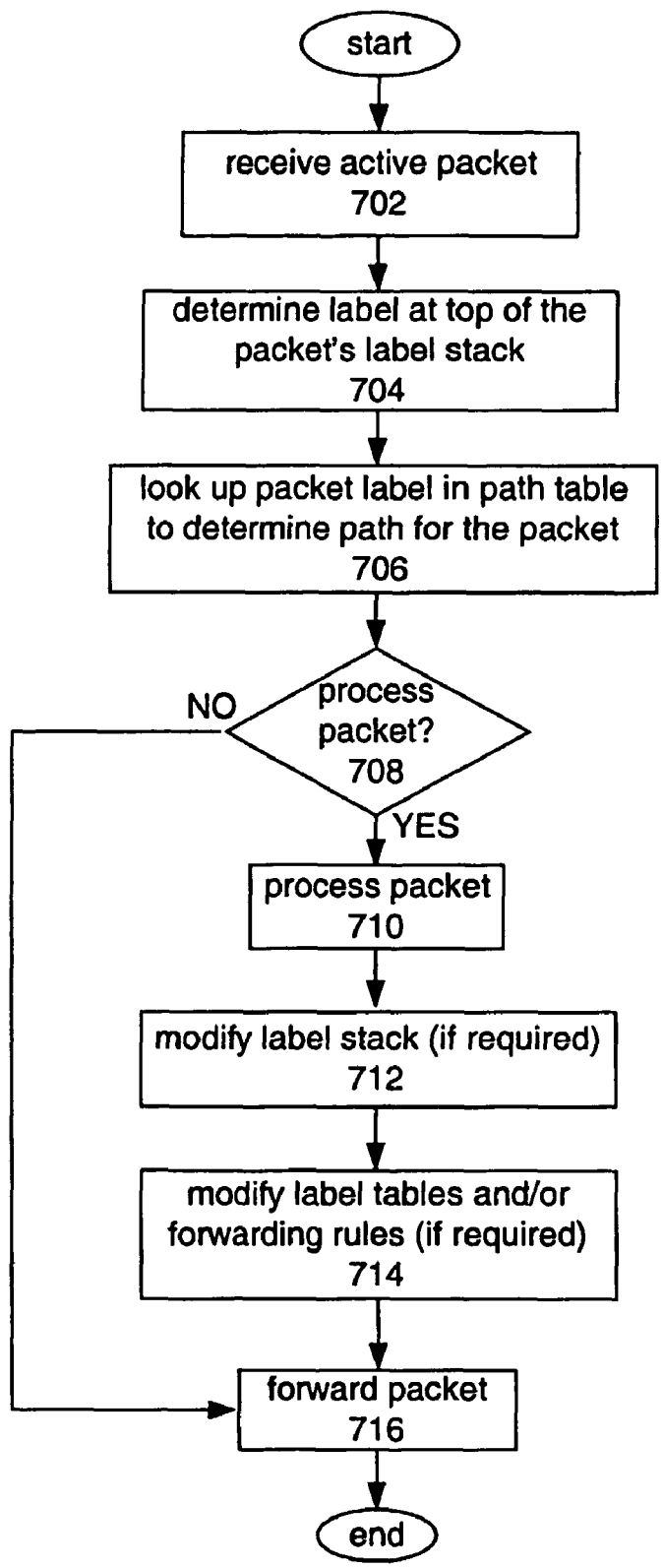
FIG. 7 is a flow diagram of a packet process executed by the active node.

The active node executes a packet process, as shown in FIG. 7, that either forwards received packets directly on the fast path component 10, or via the processing component 12. FIGS. 4A to 4D illustrate the processing of the five packets of the PVN link application by the first node 302 of the three active nodes 302 to 306 shown in FIG. 3. The packet process begins at step 702 when the first node 302 receives an active packet. At step 704, the fast path component 10 examines the label on the top of the packet's label stack, and at step 706, the fast path component 10 performs a lookup operation on its MPLS label tables to determine the appropriate action(s). Packet 1 of FIG. 4A is labelled "A". Accordingly, the test at step 708 indicates that no processing of the packet is required, and the packet is therefore forwarded on the fast path component 10 of the first node 302 at step 716.

Figure 4B:
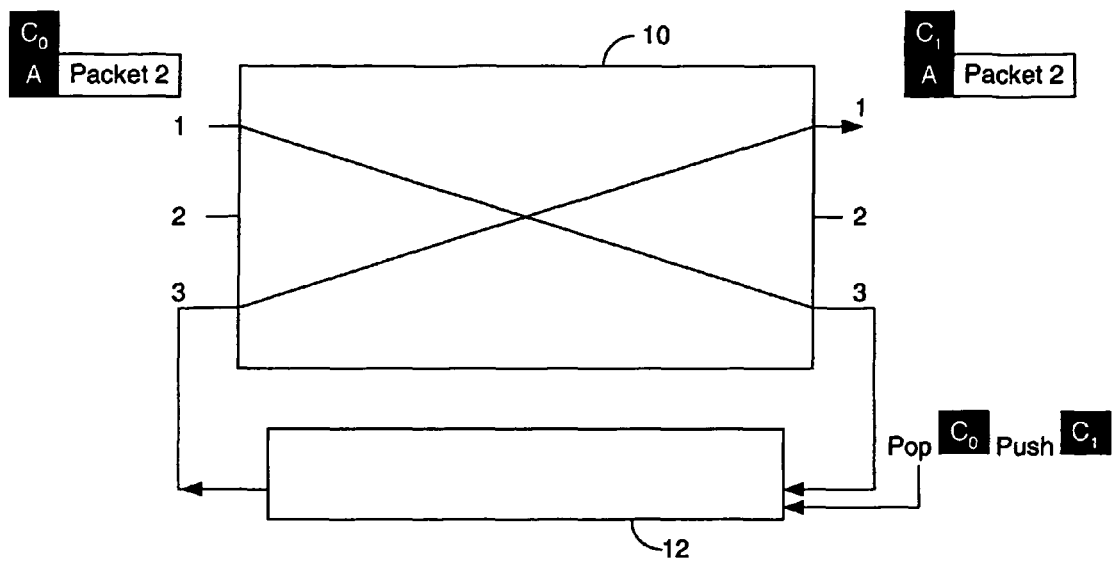

Packet 2 in FIG. 4B has the label "C0" on the top of its stack and is therefore passed to the processing component 12 and processed by the active processing engine 14 of the first node 302 at step 710. The packet can contain active application code, a reference to an active application of the application modules 17, and/or application data to be processed. The result of the processing may determine that this packet will also require processing in the active processor 14 of the second node 304. If so, then the packet's label stack is modified at step 712 by popping "C0" off the label stack and pushing "C1" onto the top of the label stack. No modifications to the label tables are required at step 714, so the packet is then returned to the fast path component 10. The packet now has the label "C1" at the top of its label stack. The fast path component 10 of the first node 302 forwards the packet to the second node 304 at step 716.

Figure 4C:
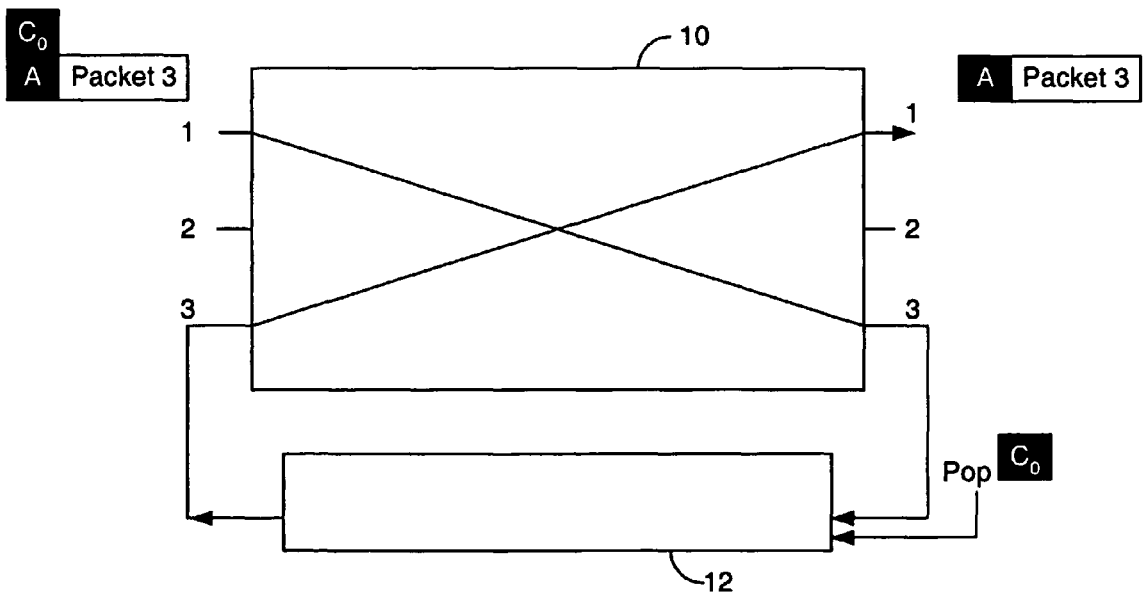

Packet 3 in FIG. 4C, also being labelled "C0", is also forwarded to the active processing engine 14. However, this time the active processing engine 14 determines that further active processing is not required at any subsequent active nodes 304, 306, and therefore pops "C0" off the top of the stack and pushes the label "A" onto the top of the label stack of the packet at step 712. The packet is then forwarded through the fast path component 10 of the first node 302 with the label "A" at step 716, and the packet therefore follows the fast path through the second and third nodes 304, 306.

Figure 4D:
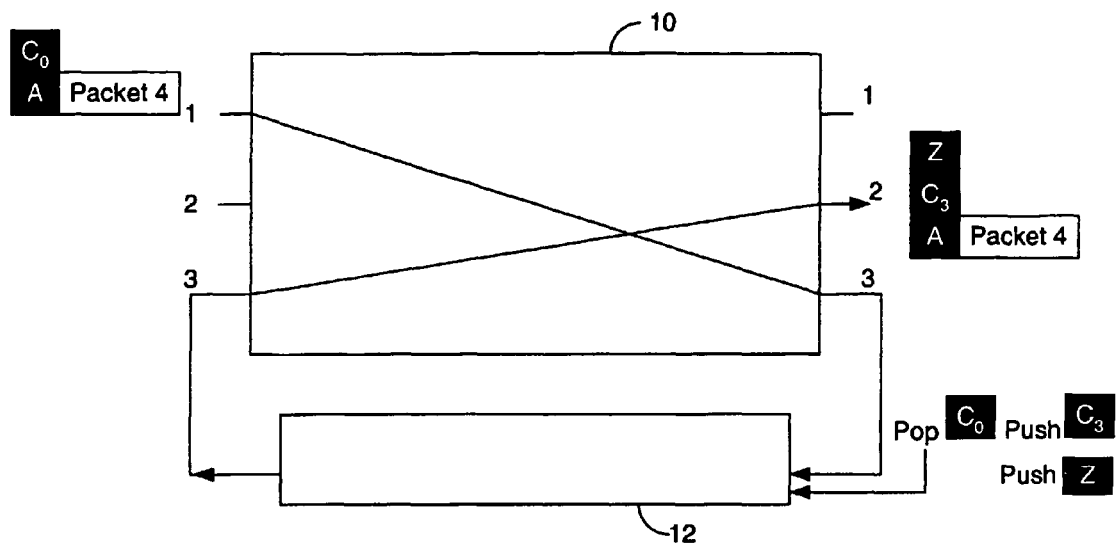
Figure 4E:
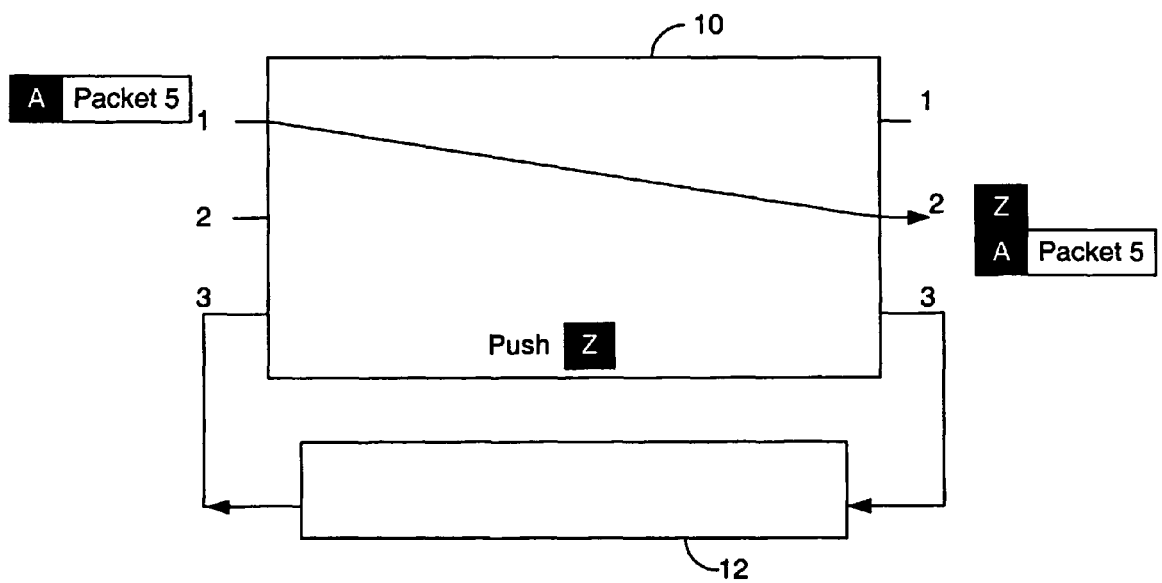

In FIG. 4D, packet 4 contains "C0" at the top of its label stack and is therefore processed by the active processing engine 14 of the first node 302 at step 710. The processing of packet 4 determines that this packet should be sent on an alternate route (this may be due to the detection of congestion or link failure by an application executing within the active processing engine 14 of the first node). Within the active processing engine 14, "C0" is popped off the stack, and "C3" and "Z" are pushed onto the label stack at step 712. This results in the packet being forwarded to the third node 306 on the alternate route "Z", bypassing the second node 304. At the third node 306, the label "C3" causes the packet to be forwarded to the active processing engine 14 of the next active node. Subsequent packets can be forwarded on the alternate LSP Z without further processing by modifying, at step 714, the configuration (i.e., the MPLS table) of the fast path component 10 of the first node 302 to push "Z" onto the label stack of all packets arriving at the switch with label "A", for example. The subsequent diversion of a packet onto the alternate route "Z" by the fast path component 10 is shown in FIG. 4E.

As described above, the use of label stacks enables flexible forwarding by allowing active applications to change the forwarding decision for packets being processed by the active processing engine 14, and for packets forwarded on the fast path component 10 without active processing. In addition, LSPs can be configured to ensure that packets are processed by active processing engines 14 only at nodes where processing is required. For default best effort packet forwarding, the MPLS Label Distribution Protocol can be used. The ability of active applications to modify the MPLS label tables of the fast path component 10 enables custom active routing protocols to be introduced into the network. In order to create LSPs between active processing engines 14, an additional label distribution method is used, such as the Resource ReSerVation Protocol, or RSVP, as described in RFC 2205 and related RFC documents. However, network performance can be improved by using a resource reservation protocol customised to the properties of the active application.

In an alternative embodiment, the first active packet or packets of an application stream is used to determine which active processing engines 14 are to be used on the route and to create the LSPs between them on demand. The first packet follows the predetermined LSPs C0, C1, C2, and C3 between the active processing engines 14 of the active nodes. This active packet determines the capabilities of each node 302 to 306, and on the basis of these capabilities determines what operations are to be performed by each node. On this basis, the active packet configures LSPs for the remainder of the packets.

For example, the active packet can use operating system calls of the processing components 12 to determine whether sufficient resources (e.g., processor cycles, physical memory) are available at a particular active node to perform the required processing. For example, the processing can include a processor-intensive process such as encryption or decryption of packet data. In such a case, the active packet is sent through the MPLS network with labels that indicate the packet is to be sent to every active node in the network. This can be achieved by labelling the active packet with a stack of labels such as $C_0, C_1, C_2, C_3, \ldots$, or preferably a single label that the fast path 10 of each active node recognises as referencing its processing component 12. After visiting all of the active nodes in the network, or after finding one or more suitable active nodes sufficient to perform the required processing, the active packet can then configure the active nodes in the network to include suitable LSPs (if they do not already exist) and/or to label active packets of the application in order to direct such packets to the active nodes identified by the first active packet(s) as having sufficient resources to perform the required processing. A content switch at the edge of the MPLS network is also configured to label the active packets of the application accordingly. These configuration changes are performed using a suitable resource reservation protocol, as described above. The result is the creation of LSPs that bypass active processing in some nodes and result in active processing in others.

For example, if processing is only required in the second node 304, then an additional LSP is created (in this case LSP D of FIG. 3) to bypass active processing in the first node 302. A packet enters the network with label D on top of its stack, followed by label A. The packet is forwarded on the fast path component 10 through the first node 302 and processed by the active processing engine 14 of the second node 304. The active processing engine 14 of the second node 304 pops label D from the label stack of the packet. The packet is then forwarded through the fast path component 10 of the third node 306, as specified by label A.

Figure 6:
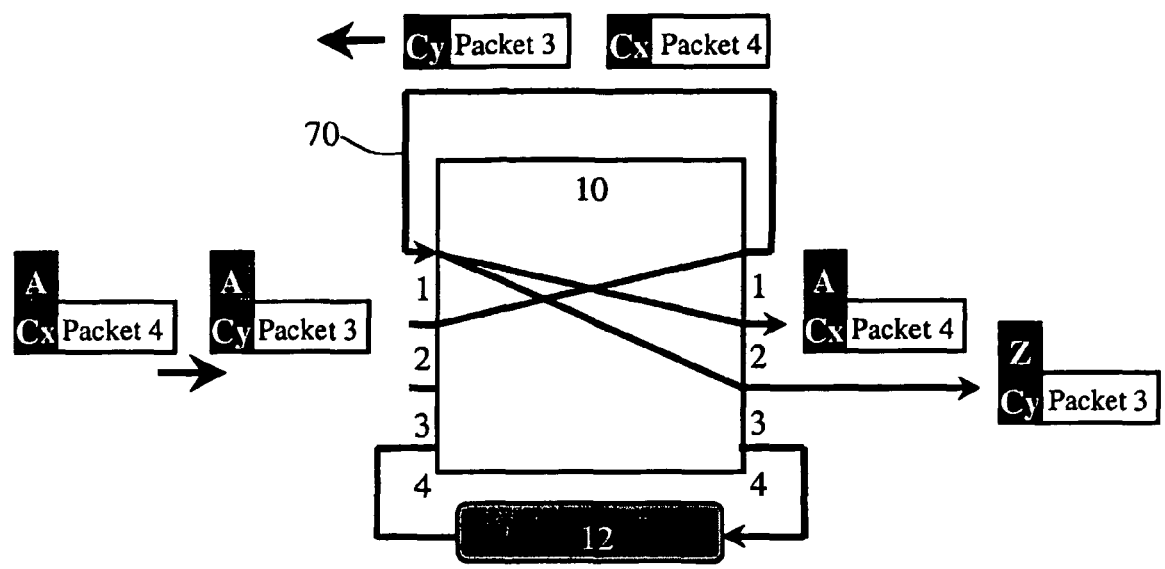
FIG. 6 is a schematic diagram of an alternative embodiment of an active node of a communications network.

Existing MPLS switches are used to switch packets based on a single label on the top of the label stack of the packet. In a further alternative embodiment, the flexibility of forwarding in the fast path component 10 is enhanced by allowing the switching of packets based upon multiple labels in a packet simultaneously. This can be achieved by modifying internal hardware components of an existing MPLS switch or by adding a multiple label switch hardware component to the ports of an existing MPLS switch. For example, a loopback connection 70 can be added to an existing MPLS switch that allows different labels to select different output ports, as shown in FIG. 6. The loopback 70 enables more than one MPLS switching operation on a packet by recycling the packet through the switching fabric of the fast path component 10.

In the example of FIG. 6, the traffic aggregate is directed through the network on LSP A. An additional label is placed under A by an active node or content switch at the edge of the MPLS network, as described above. Ordinarily, the underlying labels are ignored. However, the packet can be switched on the basis of both labels using the following procedure. The active processing engine 14 determines that packets labelled Cy are to be redirected onto LSP Z. The forwarding control component 16 of the processing component 12 then manipulates the MPLS tables of the fast path component 10 to pop the top label of packets labelled A and to redirect those packets to the loopback output port 1. The loopback 70 returns the packets to the fast path component 10 at input port 1. The MPLS tables of the fast path component 10 are also modified so that packets arriving at input port 1 are switched as follows: if the packet label is Cx, then push label A onto the packet's label stack and send the packet to output port 2. Conversely, if the packet label is Cy, then push label Z onto the packet's label stack and send the packet to output port 3. The effect of this process is to switch the packets based on multiple labels, rather than only the top label used by standard MPLS switching.

Alternatively, the top label can represent path information and the lower label can represent application information (such as customer number, or packet dropping priorities, for example). One example of this use of multiple labels is an implementation of application-specific packet dropping or rerouting algorithms. In this example, an application stream follows a path defined by an MPLS label in the fast path 10. If an application executing in the processing component 12 detects congestion, then the fast path component 10 can be configured (by switching based on the values of the top two labels) to drop packets belonging to certain low-priority components of the stream (as indicated by the application-specific second label).

The active nodes described above use standard MPLS switches as the fast path component 10. However, in order to implement a high degree of flexibility, a large number of LSPs may be required to ensure that packets are only processed by active processing engines 14 at selected active nodes. In yet a further embodiment, the number of LSPs required is reduced by using reserved bits in the MPLS header to indicate which packets require processing by the active processor. These reserved bits are currently not used by standard MPLS switches. This provides a more scalable active network solution, and only requires modifications to be made to the MPLS switches associated with active nodes; intermediate non-active MPLS switches do not need to be changed.

Figure 5:
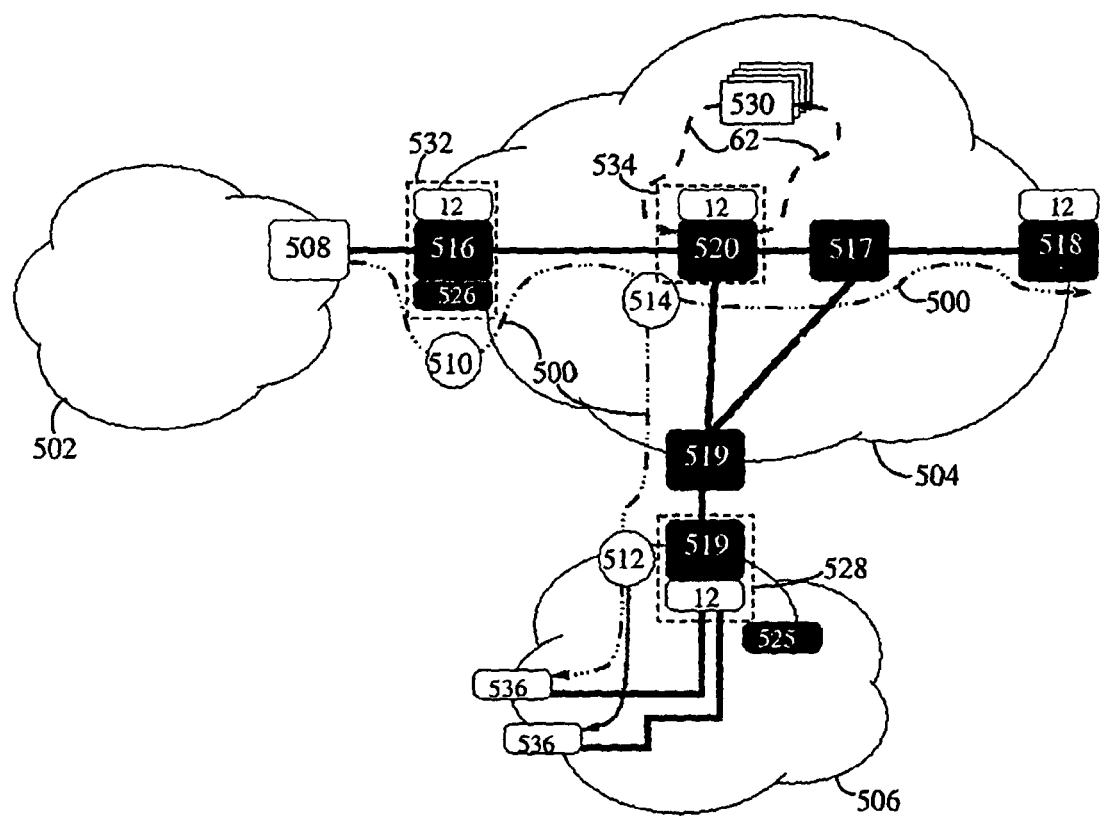
FIG. 5 is a schematic diagram of a carrier grade active network topology defined by active nodes implemented by adding active processors and content switches to existing MPLS switches in a legacy carrier grade network.

The active nodes described above can be used to provide active network services in a legacy carrier grade non-active network, as shown in FIG. 5. The network includes six non-programmable MPLS switches 516 to 520, a number of active processors 12, a Processor Farm (PF) 530, Content Switches (CS) 525, 526, Active Edge Routers (AER) 536, and a Non-Active Router 508. The active processors 12 are connected to four MPLS switches 516, 518, 519, 520 by packet i/o ports and also by a switch management port to set-up LSPs and change MPLS table entries. The Content Switches 525, 526 are capable of switching packets at line rate based on information within the packet header, and are used to extract packets from an aggregate flow, and to insert the appropriate MPLS labels to enable processing in required nodes within the carrier grade network 504. The Active Edge Routers 536 are programmable nodes with processing and MPLS capabilities. The Non-Active Router 508 is an edge switch that is not aware of active applications.

A particular PVN application provides a multimedia multicast service that supports many features such as transcoding and the addition of local or targeted advertising, (i.e., processor-intensive active applications of the application modules 17). In FIG. 5, a PVN logical topology 500 is mapped over the physical infrastructure of the network. This PVN 500 connects a network 502 in Singapore through the Australian carrier grade network 504 to a network 506 in Sydney and a network (not shown) in Perth. The Singapore network 502 is designed and implemented (using specialised hardware) to support proprietary protocols. The PVN topology 500 enables a company based in Singapore to effectively extend their network to customers in Australia without implementing their own hardware. To support their multimedia service, the company needs to peer their non-active edge router 508 in Singapore to a virtual router 510 in the Australian carrier grade network 504 that supports their proprietary multicast, routing and billing protocols. They also require virtual routers 512 with similar capabilities near their customer bases in Sydney and Perth. In addition, they require a virtual router 514 between Sydney and Perth to enable efficient multicast and caching.

In order to support the multimedia PVN over the Australian carrier grade network 504, active processing components 12 are connected to several existing MPLS switches 516, 518, 519, 520. An active processing component 12 is connected to the MPLS switch 516 peering the Singapore network, defining a first active node 532. In addition, active processing components 12 are connected to an MPLS switch 519 located in Sydney, defining a Sydney active node 528, and another located in Perth. The intermediate virtual router 514 between Sydney and Perth (required for efficient multicast) requires an active processing component 12 connected to an MPLS switch 520 within the core of the carrier grade network 504, defining an intermediate active node 534. The position of this MPLS switch 520 is determined by the delay constraints of the multimedia service. Because the Singapore network 502 is a proprietary network, a content switch 526 is placed at the edge router of the Australian carrier grade network 504. This content switch 526 uses filters to extract packets that belong to the multimedia PVN and to push the appropriate MPLS labels onto the label stacks of these packets. Content switches are not required in the remainder of the Australian carrier grade network 504 because the active edge nodes 536 in Sydney and the active edge nodes in Perth are programmable and place packets belonging to the PVN onto the appropriate LSPs. In this example, the active edge nodes 536 in Sydney are fully integrated programmable routers that support the PVN.

The carrier grade network 504 may also require one or more processor farms 530 for performing processor-intensive work that cannot be adequately supported by the active processing components 12 of the active nodes 528, 532, 534. For example, the router 508 in the Singapore network 502 wishes to multicast packets to nodes in the Sydney network 506 and the Perth network. The Singapore network 502 subscribes to a PVN multicast service. The content switch 526 in the first active node 532 extracts all packets belonging to a particular media streaming application (determined from the network address and/or port range of the packets) and places these packets on the multimedia PVN destined for the second node 304. The packets reach the intermediate active node 534 and are forwarded by a multicast protocol to the Sydney and Perth networks 506. The virtual router 514 of the intermediate node 534 determines that the multicast branch destined for the Perth network requires a high level of processing, such as the addition of localised advertising. There is insufficient processing power in the intermediate node 534 to perform this processing locally. The label for a pre-configured LSP linking a nearby processor farm (PF) 530 is pushed onto the stack for all packets belonging to this media stream. The processor intensive work of adding localised advertising is performed by the processor farm 530 and the packets are then returned to the intermediate node 534 for forwarding. The LSP may also indicate a particular virtual processor or execution environment within the processor farm 530, as described above.

If the same multicast originated in the Sydney network 506 which contains active edge routers 536, then the content switch 525 is not required because the active edge routers 536 direct the appropriate multimedia packets onto the multicast PVN. However, the addition of content switches in active-capable edge networks provides additional flexibility. For example, it enables the implementation of a reliable multicast protocol that requires processing of negative acknowledgements (NACKs) by branch nodes in the active multicast tree. A content switch in the edge network can be used to detect and add MPLS labels to NACK packets generated by hosts (which may be unaware of the reliable multicast protocol) to enable active processing in the required nodes.

Many modifications will be apparent to those skilled in the art without departing from the scope of the present invention as herein described with reference to the accompanying drawings.

The invention claimed is:

1. An active node for use with packets of an active application sent from a source node to a destination node in a packet-switched network, each of the packets including multi-protocol label switching (MPLS) data representing at least one label switched path of the network, and at least one of active application code, references to active application code, and application data of the active application, the active node comprising:
   an active application processing component configured to execute the active application code contained in or referenced by at least one of the packets; and
   label switched routing component configured to receive and route the packets and in communication with the processing component;
   wherein:
      the routing component is configured to determine, for each of the packets, whether to forward such packet to the processing component or to bypass the processing component, based on the MPLS data of the packet;
      the active application processing component executing the active application determines one or more paths to one or more other such active application processing components for processing at least one of the packets, the one or more other such active application processing components being selected on the basis of one or more processing requirements of the active application and one or more corresponding processing capabilities of the other such active application processing components; and
      at least one of the routing component and the active application processing component is configured to modify at least one of an MPLS label table of the active node and the MPLS data of the at least one packet so that the at least one packets is forwarded to the selected one or more other such active application processing components for processing.

2. A node as claimed in claim 1, wherein the active node includes at least one of the one or more other active application processing components.

3. A node as claimed in claim 1, wherein the processing component is configured to determine the one or more requirements of the active application on the basis of at least one first packet of the active application.

4. A node as claimed in claim 1, wherein at least one of the processing component and the routing component is configured to push one or more MPLS labels representing the one or more paths onto a path stack of the MPLS data of the at least one packet.

5. A node as claimed in claim 1, wherein the routing component is configured to determine whether to forward a packet to the processing component or to bypass the processing component based on reserved bits of a MPLS headers of the MPLS data of the packets.

6. A node as claimed in claim 1, wherein the MPLS data of each received packets includes a label stack of one or more MPLS labels, and at least one of the processing component and the routing component is configured to modify the MPLS label stack of each packets to include one or more MPLS labels representing the one or more paths.

7. A node as claimed in claim 1, wherein the capabilities of the one or more other active application processing components correspond to respective different processing operations to be performed on the application data of the packets.

8. A node as claimed in claim 1, wherein the one or more other active application processing components are selected at least in part based on one or more available resources thereof.

9. A node as claimed in claim 1, wherein the one or more other active application processing components include active application processing components of respective other active nodes of the network.

10. A node as claimed in claim 9, wherein the processing component is configured to determine the one or more requirements of the application from the first at least one packet of the active application.

11. A node as claimed in claim 1, wherein the at least one packet includes the active application code.

12. A node as claimed in claim 1, wherein the at least one packet includes a reference to the active application code, the active application code being external to the at least one packet.

13. A node as claimed in claim 1, wherein the routing component is configured to process a plurality of MPLS labels of a label stack of a received packet.

14. A node as claimed in claim 13, wherein the routing component includes input and output ports and a loopback connection between the input and output ports to enable processing of the plurality of MPLS labels of the label stack of a received packet.

15. A node as claimed in claim 13, wherein the two or more MPLS labels of a label stack of a packet determine a path for the packet.

16. A node as claimed in claim 1, wherein the active application processing component includes a plurality of microprocessors for executing active application code.

17. A node as claimed in claim 1, wherein the processing component includes a plurality of virtual active application processing components, and the routing component is configured to forward a received packet directly to the network or to select one of the plurality of virtual active application processing components and to forward the received packet to the selected virtual active application processing component, based on the MPLS data stored in the received packet.

18. A node as claimed in claim 1, wherein the routing component is configured to forward or drop a received packet on the basis of at least one MPLS label of the received packet.

19. A node according to claim 1, wherein the routing component and the active application processing component are separate entities.

20. A node according to claim 1, wherein the routing component and the active application processing component are combined in an integrated device.

21. A process executed by an active node programmed to execute the process, the active node being a node in a packet-switched network and being for use with packets of an active application sent from a source node to a destination node in the packet-switched network, each of the packets including multi-protocol label switching (MPLS) data and at least one of active application code, references to active application code, and application data, the process including:
receiving packets of the active application at the active node;
executing the active application code contained in or referenced by at least one of the packets to determine one or more paths for the at least one of the packets of the active application, the at least one of the packets being selected for the code execution in dependence on the MPLS data of the at least one of the packets, wherein the one or more paths are to respective active application processing components selected on the basis of their processing capabilities and one or more requirements of the active application;
modifying at least one of a MPLS label table of the active node and the MPLS data of the at least one packet so that the at least one packets is forwarded to the selected active application processing components; and
forwarding the at least one of the packets.

22. A process as claimed in claim 21, wherein the step of modifying includes storing data representing the at least one path in the MPLS table of the node, and the forwarding of the at least one of the packets is based on one or more MPLS labels stored in the packets and the data stored in the MPLS path table.

23. A process as claimed in claim 21, wherein the capabilities of the one or more other active application processing components correspond at least in part to one or more available resources of the other active application processing components.

24. A process as claimed in claim 21, wherein the active node includes at least one of the one or more other active application processing components.

25. A process as claimed in claim 21, wherein the one or more requirements of the application are determined on the basis of the at least one of the packets of the active application.

26. A process as claimed in claim 21, wherein the step of modifying includes pushing one or more MPLS labels onto a path stack of the at least one packets.

27. A process as claimed in claim 21, wherein the one or more other active application processing components include active application processing components of respective other active nodes of the network.

28. A process as claimed in claim 21, wherein data representing the one or more paths is stored in reserved bits of MPLS headers of the packets.

29. A process as claimed in claim 21, wherein the routing component is configured to select a virtual active application processing component for processing a received packet based on one or more reserved bits of a MPLS header of the MPLS data stored in the received packet.

30. A process as claimed in claim 21, including:
forwarding at least one first packet of the active application to one or more other active nodes of the network, the at least one first packet including or referencing active application code configured to determine one or more capabilities of the other active nodes of the network; and
receiving active node capability data identifying one or more of the other active nodes of the network and one or more corresponding capabilities, as determined by the at least one first packet of the active application;
wherein the determining of one or more paths for the at least one of the packets is based on the received active node capability data so that packets of the active application can be sent on label switched paths to the other one or more active nodes of the network based on the determined capabilities of those nodes and the corresponding one or more requirements of the active application.

31. A process as claimed in claim 30, wherein the MPLS data includes a stack of one or more MPLS labels, and the step of modifying includes pushing one or more MPLS labels representing the one or more paths onto the label stack.

32. A process as claimed in claim 31, wherein the step of modifying includes removing one or more MPLS labels from the label stack.

33. A process as claimed in claim 21, wherein the one or more requirements of the application are determined from the first at least one packet of the application.

34. A process as claimed in claim 21, wherein the at least one packet includes the active application code.

35. A process as claimed in claim 21, wherein the at least one packet includes a reference to the active application code, the active application code being external to the at least one packet.

36. A network node having components for executing the steps of claim 21.

37. A non-transitory machine readable storage medium, having stored thereon program code for executing the steps of claim 21.

* * * * *

UNITED STATES PATENT AND TRADEMARK OFFICE
CERTIFICATE OF CORRECTION

| | | |
|---|---|---|
| PATENT NO. | : 8,116,325 B2 | Page 1 of 1 |
| APPLICATION NO. | : 10/495819 | |
| DATED | : February 14, 2012 | |
| INVENTOR(S) | : Paul Andrew Boustead | |

It is certified that error appears in the above-identified patent and that said Letters Patent is hereby corrected as shown below:

On the face of the patent, under the Assignee, please change:

-Melbourn, Victoria, Ontarioto

"Melbourne, Victoria, Australia"

Signed and Sealed this
Fourth Day of September, 2012

David J. Kappos
*Director of the United States Patent and Trademark Office*